United States Patent
Töpfer

(10) Patent No.: US 7,331,155 B2
(45) Date of Patent: Feb. 19, 2008

(54) CLIP FEED ARRANGEMENT

(75) Inventor: Klaus Töpfer, Büttelborn (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 11/074,324

(22) Filed: Mar. 3, 2005

(65) Prior Publication Data

US 2006/0254211 A1   Nov. 16, 2006

(30) Foreign Application Priority Data

Mar. 3, 2004   (DE)   ..................... 10 2004 010 390

(51) Int. Cl.
B65B 51/04   (2006.01)

(52) U.S. Cl. .................. 53/138.2; 53/138.4; 53/567; 29/243.56; 452/48

(58) Field of Classification Search ................. 53/417, 53/138.2–138.4, 567; 29/243.56, 243.57; 452/48; B65B 51/04, 51/05
See application file for complete search history.

(56) References Cited

U.S. PATENT DOCUMENTS

| | | | | |
|---|---|---|---|---|
| 2,812,628 | A | * | 11/1957 | Russell et al. ............. 53/138.4 |
| 3,163,969 | A | * | 1/1965 | Irwin et al. ................ 53/138.3 |
| 3,189,220 | A | | 6/1965 | Mullaney |
| 3,622,061 | A | * | 11/1971 | Hoyer et al. ................ 227/120 |
| 3,668,818 | A | * | 6/1972 | Holmes ..................... 53/138.3 |
| 4,332,193 | A | * | 6/1982 | Noyes ...................... 53/138.3 |
| 4,428,176 | A | * | 1/1984 | Burrell ..................... 53/138.4 |
| 4,571,805 | A | | 2/1986 | Niedecker |
| 4,675,945 | A | | 6/1987 | Evans et al. |
| 4,827,591 | A | | 5/1989 | Arnone et al. |
| 5,067,313 | A | * | 11/1991 | Evans ....................... 53/138.4 |
| 5,586,424 | A | | 12/1996 | Chen et al. |
| 6,139,416 | A | | 10/2000 | Töpfer |
| 6,182,734 | B1 | | 2/2001 | Ebert et al. |
| 6,217,436 | B1 | | 4/2001 | Hanten et al. |
| 6,651,705 | B1 | | 11/2003 | Töpfer |
| 6,691,389 | B1 | | 2/2004 | Töpfer |
| 6,846,235 | B2 | | 1/2005 | Töpfer |
| 6,920,738 | B2 | * | 7/2005 | Wilkins et al. ............. 53/138.2 |
| 2002/0108665 | A1 | * | 8/2002 | Thieme ..................... 140/123 |
| 2003/0005664 | A1 | | 1/2003 | Töpfer |

FOREIGN PATENT DOCUMENTS

| | | |
|---|---|---|
| CH | 678382 | 9/1991 |
| DE | 23 39 560 | 2/1975 |
| DE | 196 44 074 | 5/1998 |
| DE | 199 53 694 | 5/2001 |
| EP | 1 229 799 | 8/2002 |
| EP | 1 269 851 | 1/2003 |
| FR | 2 287 176 | 5/1976 |

OTHER PUBLICATIONS

U.S. Appl. No. 11/071,565, Clip Feeder.
U.S. Appl. No. 11/071,564, Clip Stack.

* cited by examiner

Primary Examiner—Stephen F. Gerrity
(74) Attorney, Agent, or Firm—Hahn Loeser & Parks LLP; Michael H. Minns

(57) ABSTRACT

A clip feed arrangement including a magazine bar for guiding a line of clips from a clip supply to a separating device of a closure apparatus, and a clip drive arranged in the region of the magazine bar. The clip drive has two drive elements which can be successively brought into engagement with the line of clips and which separately produce the advance.

13 Claims, 8 Drawing Sheets

Fig. 5        500

CLIP FEED ARRANGEMENT

TECHNICAL FIELD

The invention concerns a clip feed arrangement comprising a magazine bar for guiding a line of clips from a clip supply wound on a reel to a separating device of a closure apparatus for producing sausages and a clip drive arranged in the region of the magazine bar.

BACKGROUND OF THE INVENTION

The closure apparatus referred to hereinbefore is used for making sausages with a generally pasty filling material in a flexible tubular case (for example a sausage casing). Those closure apparatuses (also referred to hereinafter as automatic clipping machines) usually function in such a way that the filled tubular case which is closed at one end is constricted at a location by means of so-called displacement elements and thereupon filling material in the constriction region is displaced by a movement in the direction of the axis of the tubular case. At least one closure element (or clip) is placed on the plaited end portion of the tubular case which is formed in that way, and closed.

In that fashion, either interconnected chains of sausages can be produced or for example individual tubes or bags are closed. When using what are referred to as automatic double clipping machines, two mutually juxtaposed clips are simultaneously placed on the plaited end portion of the tubular case formed in the above-described manner and closed, whereupon the plaited end portion is severed between the two clips. In that way individual sausages are produced in series.

As in all areas of technology, it has also been possible in the past to increase the level of productivity in the field of the clipping machines, by a considerable amount. That requires suitable adaptation of the peripheral devices—thus including the magazine bar and the entire clip feed arrangement. The simplest known clip feed arrangements comprise a substantially vertically arranged magazine bar onto which a "finite" line of clips comprising a plurality of clips which are arranged in a successive row and which are joined by a sealing strip are drawn by hand. As is known, at its lower end near the closure apparatus, the magazine bar is turned in a radius such that the line of clips is fed horizontally to a separating window of the closure apparatus, the window generally being arranged perpendicularly. Here, at the exit from the magazine bar, the clip which is the leading one in the advance direction is separated from the line of clips for further processing therewith.

The advance movement in the case of that clip feed arrangement is usually produced by the force of gravity. The maximum supply of clips is predetermined by the capacity of the magazine bar. As the latter is arranged vertically by virtue of the drive action produced by the force of gravity and as it must be easily possible to reach the entry thereof for the purposes of manually drawing the lines of clips onto the magazine bar, its length and thus capacity are greatly restricted. It is only limitedly suitable for closure apparatuses which operate at high speed as continuous manual restocking of the magazine would be required.

For another situation of use, U.S. Pat. No. 3,189,220 discloses a horizontal belt and friction roller drive for finite lines of staples which are stored in an upstream-disposed vertical magazine and which are automatically fed therethrough under the effect of the force of gravity. A clip feed arrangement which is also known and which is a further development is distinguished in that the line of clips is wound on a reel which—for hygiene reasons also—is suspended above the separating window, to provide a larger clip supply. The virtually "endless" line of clips is drawn off that reel and introduced into the entry of a magazine bar. The geometry of the magazine bar is essentially identical to that of the above-described magazine bar which however, because of the reel supply, no longer has to perform the function of forming the supply of clips. The vertical part of the magazine bar can therefore be shorter.

The advance movement in the case of that clip feed arrangement is usually produced by an active clip drive which engages the line of clips in the region of the magazine bar. Two drive mechanisms are known. On the one hand, the required drive force can be applied by way of two permanently or intermittently driven friction rollers which bear against the line of clips on opposite sides. Alternatively, it is also possible to provide a drive in which two linearly reciprocatable entrainment members which engage the line of clips alternately produce the advance movement as a stepwise motion.

When the clip supply has been used up, that is to say the reel has been unwound and the last clip in the line thereof has passed the clip drive, the closure apparatus is generally automatically stopped as then the drive can no longer engage the remaining line of clips which is disposed in the magazine bar and thus an advance movement is no longer ensured. To change the clip supply the empty reel body has to be pulled down from its holder and the remaining line of clips has to be pulled out of the magazine bar in the opposite direction to the advance direction so that the leading end of a fresh line of clips can be threaded thereinto in such a way that the drive elements of the clip drive can engage the fresh line of clips.

The stoppage times which are caused by that magazine refilling operation are undesirable. In addition, at each change, a residual portion of the line of clips which cannot be put to use is left over. In order to improve the relationship of operating time to stoppage time and also to improve the relationship of clips used to remaining clips, the clip reels were increased to a capacity of several thousand clips. At that point however the endeavors to increase productivity and output hit a limit as generally the clip reels have to be lifted manually onto the holder provided for mounting them, so that the weight thereof cannot be further unlimitedly increased.

SUMMARY OF THE INVENTION

Accordingly the object of the present invention is to provide a clip feed arrangement by which productivity and output of closure apparatuses can be increased.

In accordance with the invention that object is attained by a clip feed arrangement of the kind set forth in the opening part of this specification, having two drive elements which are spaced in the advance direction and which can be brought into engagement with the line of clips and which separately produce the advance, with an interposed buffer section.

That arrangement means that provided between the two drive elements which are arranged in succession, that is to say at a spacing in the advance direction, is a time buffer which, in dependence on the consumption of clips and the spacing between the drive elements (buffer supply or buffer section), gives an operator a sufficient opportunity to renew the clip supply while the closure apparatus can still continue to operate. More specifically, the clip feed arrangement according to the invention makes it possible for the leading end of the fresh line of clips to be introduced into the engagement region of the drive element which comes first in the advance direction, while the second drive element which is downstream thereof is still continuing to convey the trailing end of the old line of clips.

In accordance with a first advantageous embodiment the drive elements are so adapted that the first drive element of the drive elements produces a greater advance speed than the second drive element which is therebehind in the advance direction. For that purpose the drive elements preferably have friction rollers.

That measure provides that both drive elements produce the advance movement separately in such a way that the leading end of the fresh end of clips can catch up the trailing end of the old one, due to the higher drive speed of the first drive element. The gap which has occurred during the change operation can thus be closed up and there are no stoppage times at all.

In accordance with a further advantageous configuration at least two drive elements are so adapted that they circulate in the same direction on a closed path which includes an advance path along a portion of the magazine bar, on which at least one drive element in a condition of engagement travels in the advance direction and a return path on which the other drive elements which are out of engagement travel in opposite relationship to the advance direction. A suitable buffer supply is then provided between two adjacent drive elements which for example can be in the form of entrainment members on a circulating chain or a circulating belt.

Still a further advantageous configuration provides that the drive elements can be brought selectively into engagement with the line of clips and are adapted such that a first drive element in a condition of engagement travels along a first advance path in the advance direction while a second disengaged drive element travels along a second advance path in opposite relationship to the advance direction and that the engagement and the direction of travel of the drive elements is reversible.

The term advance path means the path of movement along the guide path which is predetermined by the magazine bar and over which the drive element which is in a condition of engagement applies its advance to the line of clips. That solution means that the leading end of the new line of clips can be passed (manually) through below the drive element which is in a condition of disengagement, as far as the end of the old line of clips, while the latter is still being conveyed in the advance direction by the drive element engaging same. The time buffer which is available for that purpose is again determined by the clip consumption and the spacing between the drive elements. Thereafter, the condition of engagement and the direction of travel of the two drive elements is reversed by reversal (manually triggered). The drive element which was previously in a disengaged condition now engages the fresh line of clips and drives it together with the old line of clips in the same advance direction while the drive element which was previously in a condition of engagement now runs back "idle" in opposite relationship to the advance direction. In that way there is no gap during the change as the fresh line of clips is brought up to the end of the old line of clips and the buffer supply has been so-to-speak filled up again. Stoppage times can be still more efficiently avoided in that way.

Preferably there are provided position limit switches which are associated with the first and second advance paths and which are actuable by the corresponding drive elements and which are respectively adapted to trigger the travel direction reversal of the two drive elements. That will generally be required if the drive elements do not circulate on a closed (circular) path but—as in the embodiment—perform a reciprocating movement.

A particularly preferred development provides that the drive elements have pawls with a freewheel direction in the advance direction and a locking direction in opposite relationship to the advance direction. Such a pawl mechanism provides that the reversal of engagement takes place passively automatically in dependence on the direction of travel.

Alternatively or additionally the drive elements are adapted to be movable radially inwardly for the purposes of disengagement and radially outwardly for the purposes of engagement. It is then advantageous if the position limit switches are also respectively adapted to trigger the outward movement of the drive element whose direction of travel is reversed into the advance direction and to trigger the inward movement of the drive element whose direction of travel is reversed into the direction opposite to the advance direction.

BRIEF DESCRIPTION OF THE DRAWINGS

The invention will now be described by means of an embodiment by way of example. In the drawing.

DETAILED DESCRIPTION OF THE INVENTION

Figure 1:
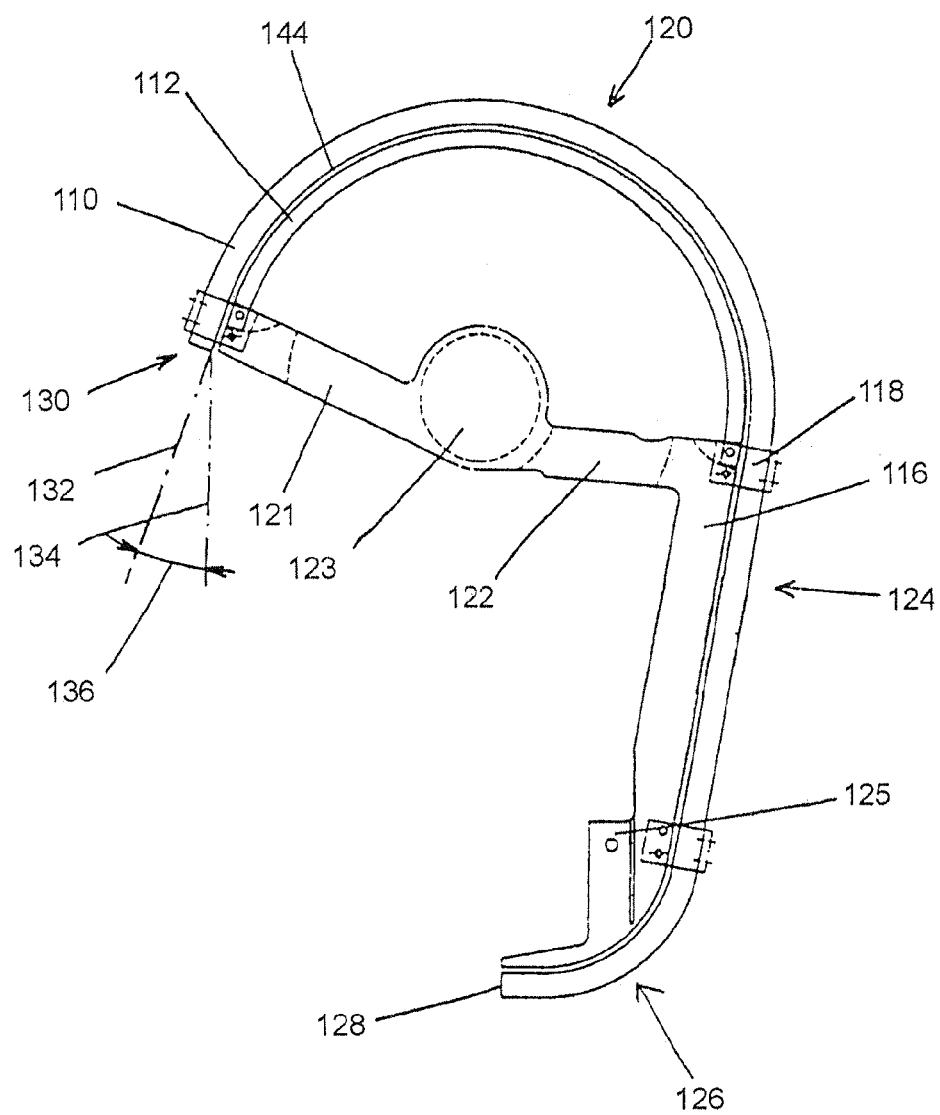
FIG. 1 shows a side view of an embodiment by way of example of a magazine bar of the clip feed arrangement according to the invention.
Figure 5:
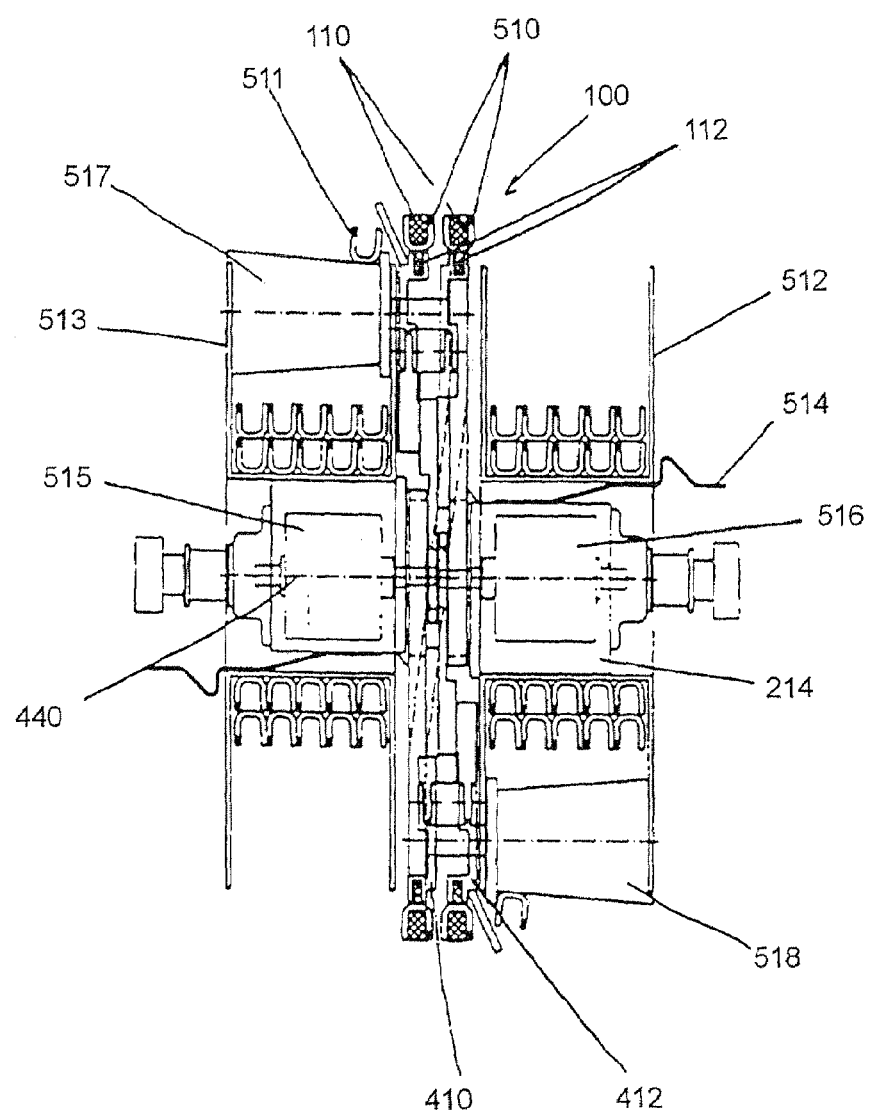
FIG. 5 shows a partial view of the embodiment of the clip feed arrangement according to the invention from above.

The magazine bar 100 according to the invention, as shown in FIG. 1, is composed of a plurality of structural elements. On the one hand it comprises an outer guide rail 110 whose cross-section, as shown in FIG. 5, substantially corresponds to the open cross-sectional profile of a U-shaped (pre-bent) closure clip 510 (referred to as the clip). Positioned in parallel relationship with the outer guide rail 110 is an inner guide rail 112 which, with the outer guide rail 110, defines a gap 114. The size of the gap approximately corresponds to the thickness of the wire of the clip so that the line of clips is securely guided between the two guide rails 110 and 112 in the manner shown in FIG. 5. The inner guide rail 112, on the side of the magazine bar 100 which is at the right as shown in FIG. 1, is functionally extended in a suspension means 116 which at the same time forms the central component for the entire magazine bar 100 in the manner described hereinafter. At the suspension means 116 the outer guide rail 110 and the inner guide rail 112 are connected together by means of three connecting elements 118 in such a way that it is precisely that gap 114 that is formed. In addition the suspension means 116 has two spokes 121, 122 which extend to the center of an upper, approximately semicircular portion 120 of the magazine bar 100 and which are connected at that center to a mounting means 123. The entire magazine bar 100 can be fixed by way of the mounting means 123 to a corresponding holder (not shown) pivotably about the axis of symmetry of rotation (for brevity: axis of rotation) of that semicircular portion 120. Finally, provided in the lower region of a straight, approximately perpendicular portion 124 is a fixing element 125 for arresting the magazine bar 100 in an operative position on the closure apparatus.

Overall the magazine bar 100 comprises three functional portions: the semicircular portion 120 forming a first deflection configuration, downstream of the first deflection configuration the straight portion 124 which in operation is arranged substantially perpendicularly, and further downstream a part-circular portion 126 forming a second deflection configuration.

The first deflection configuration 120 is such that the entry 130 to the magazine bar 100 faces downwardly—or in other words—it can be fitted with a line of clips from below. In that respect it is not an important factor that the magazine bar 100 begins with a vertical portion, but that the magazine bar 100, in the entry region, is of such an orientation that a loose or free end of a line of clips is guaranteed to be threaded into the entry 130 thereof. The orientation of the magazine bar in the entry region is clearly illustrated by a tangent 132 to the semicircular portion 120, more precisely to a guide path formed by the gap 114. Since—as mentioned in the opening part of this specification—the line of clips typically comprises a large number of individual clips arranged in a row, which are joined in the region of their backs (see FIG. 5) with a sealing strip, the free end of the line of clips will hang perpendicularly downwardly, under the effect of the force of gravity. As a consequence of that, the free end of the line of clips, the orientation of which is symbolically indicated by a vertical line 134, includes with the tangent 132 an intermediate angle 136 which at any event is not to exceed a magnitude at which it is no longer possible to guarantee that the free end of the line of clips will be threaded into the magazine bar. In that respect it is also not a matter of importance for the first deflection configuration to be formed by a semicircular portion 120 as shown in FIG. 1. It can for example equally be divided into individual portions of a circle, with portions of a different kind disposed therebetween.

The line of clips is guided downwardly downstream of the first deflection configuration, on the perpendicular portion 124. In the illustrated example, it is of a length and inclination determined by the dimensions of the reels and the closure machine. It will be appreciated that the magazine bar can be adapted to various geometrical boundary conditions between the entry 130 and the exit 128—including in other ways—.

Further downstream the line of clips is deflected once again by means of the part-circular portion 126. That portion terminates with a substantially horizontal tangent so that the magazine bar 100 opens at a right angle with its exit 128 into the substantially perpendicularly arranged separating window (not shown here) of the closure apparatus.

Figure 2:
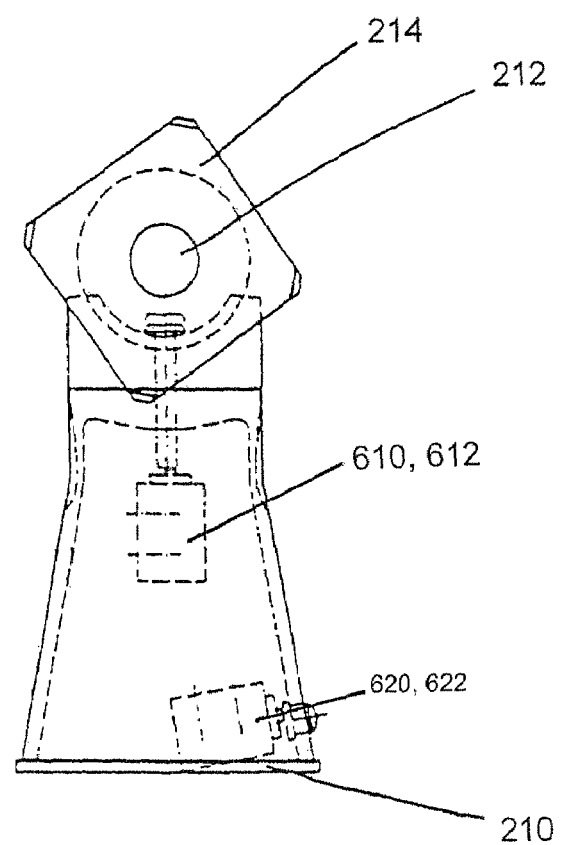
FIG. 2 shows a side view of a clip reel holder according to an embodiment of the clip feed arrangement according to the invention.

The clip reel holder 200 shown in FIG. 2 and corresponding to the magazine bar 100 is suitable for example for being mounted on the top side of the housing of a closure apparatus. It has a base 210 with which it can be fitted by a flange connection to an upper housing surface of the closure apparatus. It has a shaft 212 at its upper end in opposite relationship to the base 210. A reel mounting means 214 is mounted rotatably on the shaft 212. FIG. 5 shows a plan view of an arrangement, showing that, in a symmetrical design configuration for the clip reel holder 200, two clip reels 512, 513 can be fitted axially from opposite sides onto corresponding mounting means 214. Those reels are prevented from accidentally slipping off the reel mounting means, by springs 514.

Figure 3:
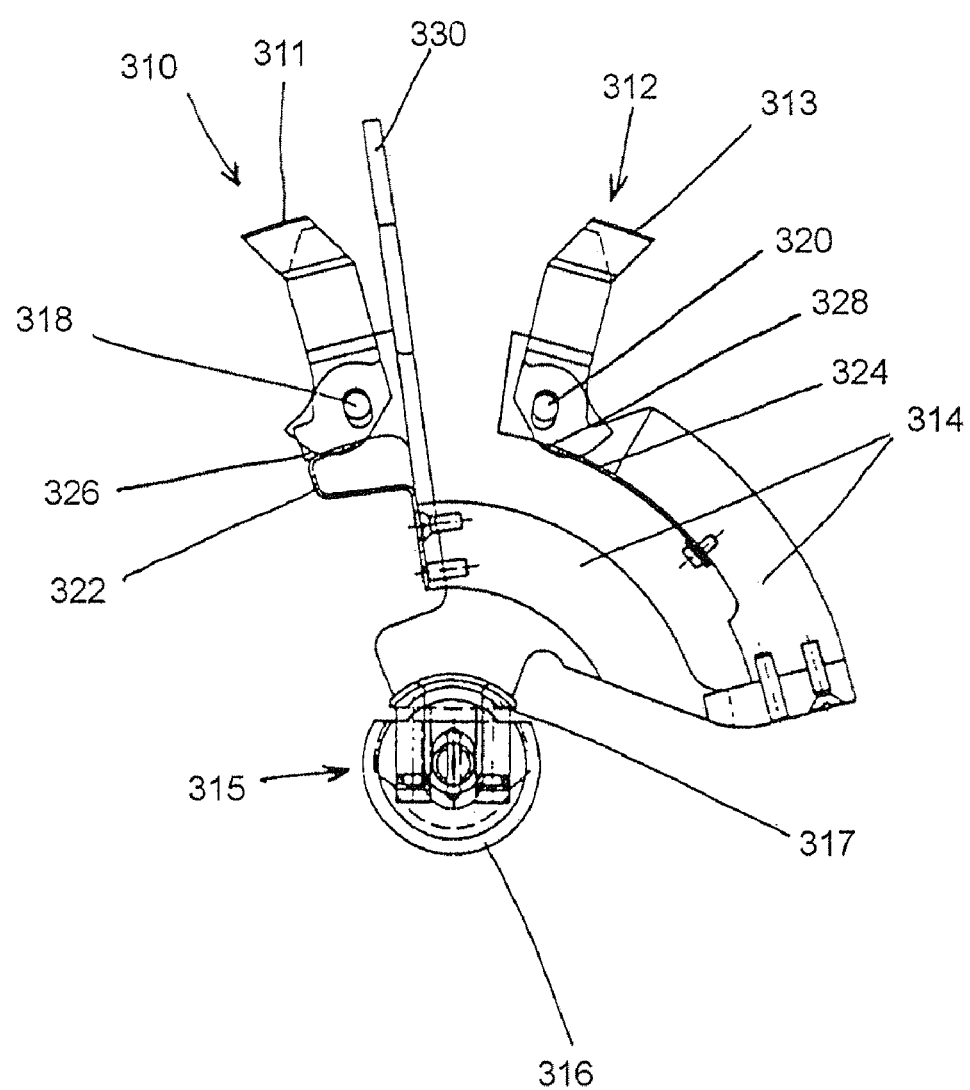
FIG. 3 shows a side view of a pair of coupled drive elements according to the same embodiment of the clip feed arrangement according to the invention.

The pair 300 of coupled drive elements 310, 312 shown in FIG. 3 comprise those drive elements 310, 312 which each have respective engagement surfaces 311, 313 which can be brought into engagement with the line of clips (not shown here), and a common arm 314 to which both drive elements 310, 312 are fixed. As can be seen from FIGS. 4 and 5, the drive elements are forked in the engagement region so that they embrace the inner guide rail 112 and can symmetrically engage the line of clips 510. The engagement surfaces can be toothed, roughened or rubberized so that either frictional entrainment or positively locking entrainment of the line of clips is involved.

The drive elements 310, 312, in opposite relationship to the engagement surfaces, have mountings 318 and 320 respectively for fixing to the arm 314, the mountings permitting both a pivotal movement of the drive elements and also a linear movement, independently thereof, of the drive elements in the radial direction.

Furthermore, at their ends in opposite relationship to the engagement surfaces, the drive elements each have a respective cam 326, 328. Two springs 322, 324 bear against those cams. The cams are shaped in such a way that the springs, by virtue of their spring force, exert a moment on the drive elements 310, 312, which urges them in their rest position into an erected position (in which they are not pivoted away). An abutment (not shown) provides that they cannot move beyond that position and thus a locking direction is predefined. In the other, so-called freewheel direction, the drive elements can be pivoted away in opposition to the spring force. They therefore act like pawls. By virtue of the structure which is of mirror-image symmetry, the freewheel direction of one pawl corresponds to the locking direction of the other pawl of the same pair 300.

Figure 6:
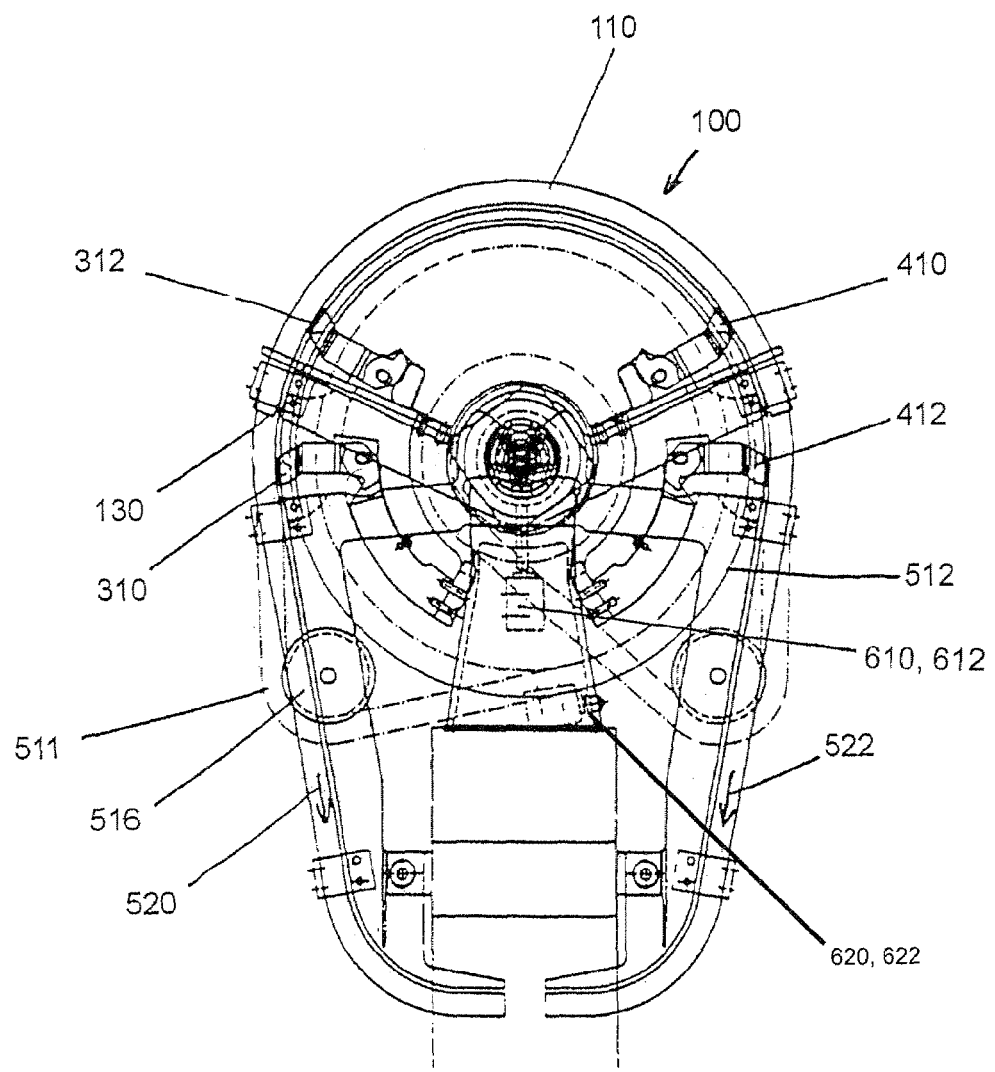
FIG. 6 shows the embodiment of the clip feed arrangement according to the invention of FIG. 5 as a total side view with the two pairs of coupled drive elements in a first limit position.

The springs 322, 324 further provide that the drive elements 310, 312 are urged radially outwardly against the line of clips, see FIG. 6. Therefore, within the limits of the linear movement permitted by the mountings 318, 320, they ensure a length or tolerance compensating effect and at the same time provide for the required contact pressure against the clips in order to ensure a reliable advance movement.

The arm 314 connects the drive elements 310, 312 to a hub 315 which is composed of a portion 316 fixed with respect to the axis and a radially movable portion 317 and the pivot axis of which is substantially equally spaced relative to the engagement surfaces 311, 313 of the two drive elements. As can be seen from FIGS. 5 through 8, in the embodiment illustrated here, the pivot axis coincides with the axis 212 of the reel mounting means 214 and the axis of rotation of the magazine bar mounting 123. The advantage arising out of that arrangement will be apparent from the functional description set forth hereinafter with reference to FIGS. 6 through 8.

The radially movable portion 317 which is connected to the arm 314 is shown in an extended position in which it is spaced from the stationary portion 316 and in which the drive elements 310, 312 bear against the line of clips. The radially movable portion 317 can be moved towards the stationary portion 316 and away therefrom again—for example by a pneumatic drive actuated either manually or automatically—. In that way the drive elements of that pair are moved jointly radially inwardly and outwardly respectively and are brought into engagement with and disengaged from the line of clips.

Finally, mounted on the arm 314 is a handle 330 which permits manual displacement of the pair of coupled drive elements 300 together with the hub 315.

Figure 4:
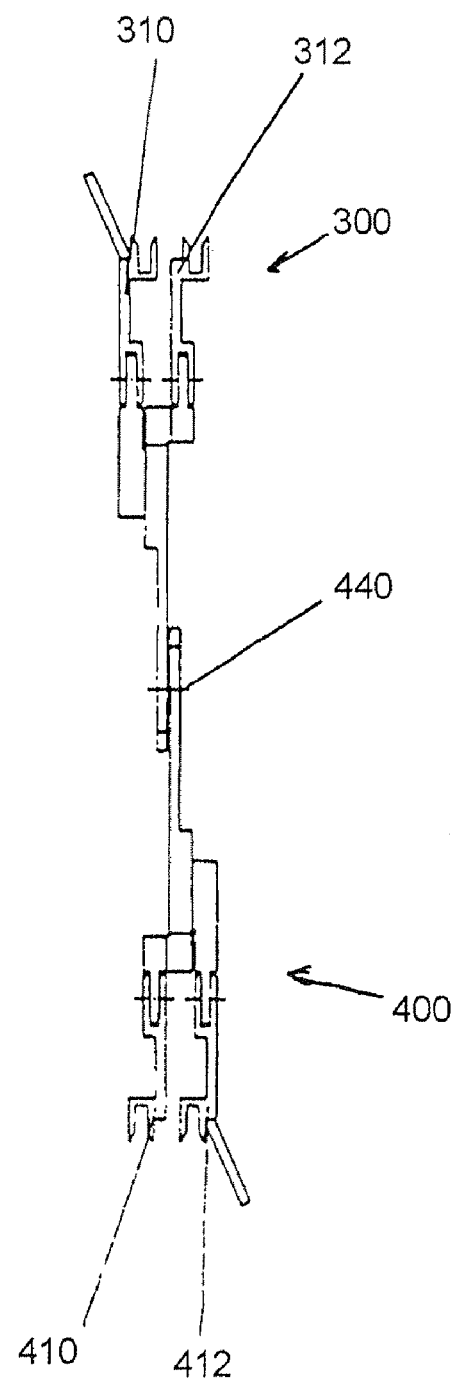
FIG. 4 shows a plan view of two pairs of coupled drive elements.

FIG. 4 shows a plan view of an arrangement of two pairs of coupled drive elements 300 and 400. They are arranged in mutually coaxially oriented relationship, that is to say the pivot axes 440 of their hubs coincide. They are also of an identical structure, but arranged in laterally reversed relationship relative to each other in such a way that the drive elements 310, 312 and 410, 412 respectively are arranged in mutually juxtaposed relationship in two parallel planes perpendicularly to the pivot axis 440. In other words, the drive elements 310, 410 and 312, 412 respectively each act in the same plane, that is to say on the same line of clips. The dual-plane arrangement makes the clip drive assembly 450 illustrated here suitable for use in a so-called double clip feed arrangement 500.

FIG. 5 illustrates the co-operation and the structural relationship of the elements set forth hereinbefore of the clip feed arrangement according to the invention, as a partly sectional plan view. On the one hand it can be seen that—as already referred to hereinbefore—the axes 440 of the reel mounting means 214, the hubs 315 and the magazine bars 100 coincide. It will also be seen that this assembly involves a double clip feed arrangement 500 with two clip feed arrangements which are disposed in laterally reversed relationship with each other and which share a common reel holder. Disposed on the common axis 440 are two preferably pneumatic pivoting drives 515, 516 which are connected to the hubs 315 and which each drive one of the respective pairs of coupled drive elements 300, 400 (in opposite directions).

A respective line of clips which is wound onto a reel body 512, 513 is unwound inclinedly downwardly and is fed by way of a respective associated direction-changing roller 517 and 518 respectively to the entry 130 of the respectively associated magazine bar 100, as illustrated in FIG. 6. The direction-changing rollers 517, 518 are tapered conically in a direction towards the central plane between the clip feed arrangements so that the line of clips 511 is deflected upon being unwound in an axial direction towards the respective magazine bar 100.

The two pairs of coupled drive elements 300 and 400, in the position shown in FIG. 6, are respectively disposed in a limit position in respect of their pivotal movement, in which the respective upper drive element 312 and 410 respectively has reached the entry region and thus the beginning of its advance path of movement. The advance path means the path of movement along the guide path which is predetermined by the magazine bar 100 or the gap 114 and over which the drive element which is in a condition of engagement applies its advance force to the line of clips. In a corresponding fashion, in that position the respective lower drive element 310 and 412 has reached the end of its advance path. In operation it is provided that the drive element which has first reached that limit position triggers the reversal of the pivotal direction of the two pairs of coupled drive elements.

This can be implemented in such a way that a position limit switch 610, 612 is provided at each limit position of the double clip feed arrangement 500. (To simplify the drawings, only one switch is shown, the other switch being positioned the first switch.) Those position limit switches 610, 612 which are associated with each advance path, being therefore in total two switches, can be actuated by both pairs of coupled drive elements for example by a portion, a cam or a projection of the respective arm 314 or the associated hub 315. The two position limit switches 610, 612 are preferably connected to the two drives by way of a common control so that it is always the position limit switch which is actuated first that triggers the directional reversal of all drive elements.

However a (central) position limit switch may also suffice if that switch is for example in the form of a flip-flop switch. It can then be actuated alternately by a respective cam provided on each arm 314 or each hub 315.

While therefore, before the arrangement switched over, the respective lower drive element 310, 412 was in engagement with the line of clips on the associated magazine bar and had advanced it in the advance direction indicated by an arrow 520, 522, the upper drive element 312, 410 respectively coupled thereto was drawn in its freewheel direction over the line of clips on the respective other magazine bar. After actuation of a position limit switch in the above-described manner, the direction of rotation of the clip drives 515, 516 is reversed. As a result the respective upper drive elements 312, 410 in FIG. 6 pass into engagement with the line of clips arranged in a row on the associated magazine bar, automatically by virtue of the their pawl function—so-to-speak passively. The drive elements 310, 412 which were previously in a condition of engagement are now retracted in their freewheel direction in opposite relationship to the advance direction, also governed by their pawl function—passively—.

The change between the locking and freewheel properties of the drive elements is not absolutely necessary but can be replaced by active radial inward and outward mobility which is linked to the reversal in direction of the pivoting drive. However, the pivotability of the drive elements about their mountings 318, 320 is absolutely necessary so that the two drive elements 310, 410 and 312, 412 respectively which act on the same line of clips can deflect in the manner shown in FIG. 7.

It can also be seen from FIG. 6 that the advance path of the drive elements includes almost the complete semicircular portion 120 of the magazine bar 100. The greater that maximum spacing between each two drive elements acting on the same line of clips, the correspondingly greater is the buffer region which is available for the change in the clip reels. As long as the end of a line of clips which has been used up is within that angular region, there is sufficient time for the leading end of a fresh line of clips to be threaded on by way of the entry 130 of the corresponding magazine bar 100, to restore a connection without any gap between the leading end of the fresh line of clips and the trailing end of the old line of clips, and to implement a reversal in the direction of travel by way of a manually actuable switch 620, 622. (To simplify the drawings, only one switch is shown, the other switch being positioned behind the first switch.) The manually actuable switch is accordingly connected to the position limit switch or switches by way of a control assembly so that the actuation of any one of those switches triggers the reversal in direction of all drive elements. As a consequence of the arrangement being switched over, the respective second drive element comes into engagement (actively or passively) with the leading end of the fresh line of clips which pushes the end of the old line of clips before it. It is possible in that way to ensure that clips are pushed along without any gaps in ongoing operation of the arrangement without stoppage times.

There is even a still greater amount of time available for changing the clip reels 512, 513 as the loose end of a consumed line of clips is hanging at the downwardly facing entry of the corresponding magazine bar and can be pulled up completely by way of same. That additional supply of clips gives the operator more time to remove the empty reel body from the respective reel mounting and to fit a full one thereto.

With the selected geometry that functionality is afforded even in a very small space. More specifically it can be seen from FIGS. 6 through 8 that the diameter of the reel bodies 512 approximately corresponds to the diameter of the semicircular portion of the magazine bars 100. The magazine bar 100 does not occupy any substantial additional space in comparison with the space required by the reel bodies 512, 513 which are present in any case, with the maximum length of the buffer supply. That affords in particular the advantage of a compact structure. The invention however is not necessarily tied to that structural shape. Assuming the pivoting drive, the requirement that the advance path is in the form of a segment of a circle is sufficient.

Figure 7:
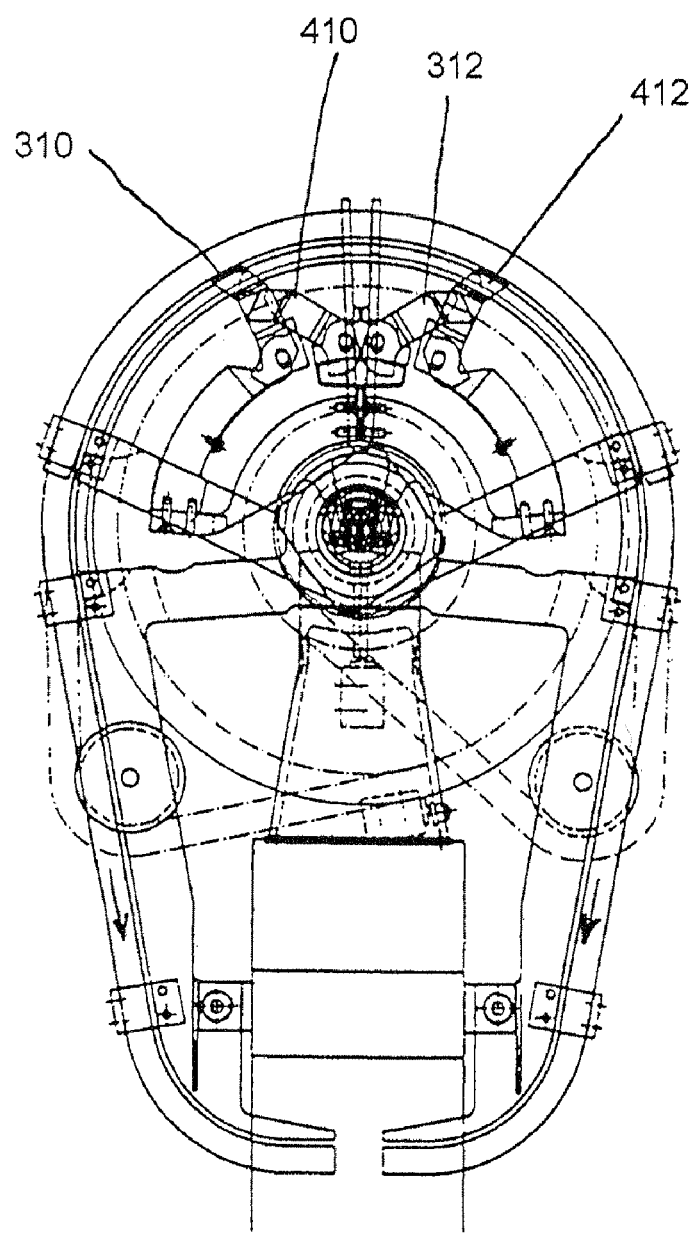
FIG. 7 shows the same view of the embodiment of the clip feed arrangement with the two pairs of coupled drive elements in a mutually crossing position.

FIG. 7 shows the drive elements in another position. They are so designed that the drive element 410, 312 which is just out of engagement is pivoted passively away against the spring force about its respective mounting 318, 320, when it passes the drive element 310 and 412 respectively which is in engagement on the same line of clips. Another construction can also be involved in place of the this advantageous development. For example, the advance paths of both drive elements which act on the same line of clips can be completely separate so that no such encounter can occur. Under those circumstances also it would be possible to implement a double clip guide arrangement with only two (pivoting) drives, but at the cost of a less compact structural configuration.

Figure 8:
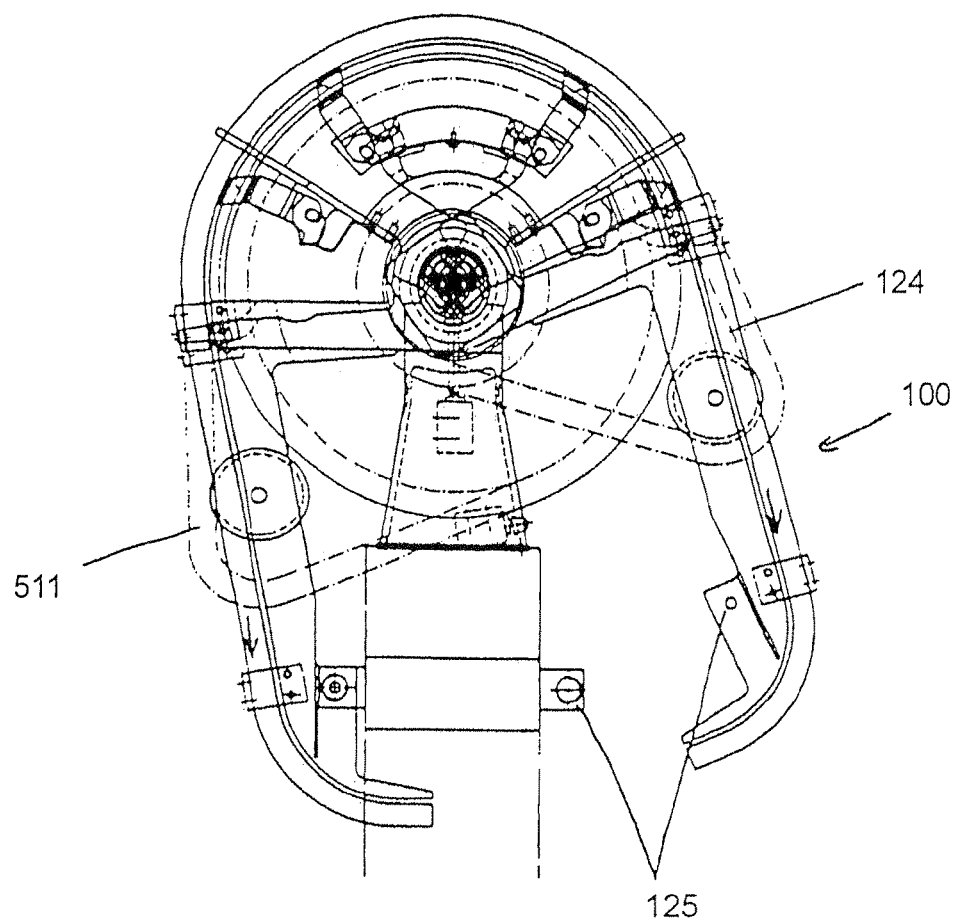
FIG. 8 shows a side view of the clip feed arrangement according to the invention with a magazine bar which has been pivoted away.

FIG. 8 shows the same embodiment of the clip feed arrangement according to the invention, in a view showing one of the two magazine bars 100 pivoted away, after release of the arresting means 125, in such a fashion that the exit 128 which is provided for communicating with the corresponding separating window is disposed at a spacing in relation to that window. That pivotal movement serves the purpose of affording access to the separating window and the clip mechanism of the closure apparatus. That can be required for example in the case of malfunctions due to jammed or backed-up closure clips in the advance passage thereof behind the separating window. It is advantageous in that respect that the pivotal movement of the magazine bar about its mounting 123 provides that the entire magazine bar still remains secured to the clip feed arrangement while it was hitherto necessary for the magazine bar mounted in the region of its exit to the housing of the closure apparatus by a flange connection to be completely removed from the closure apparatus. That had the consequential effect that firstly the line of clips disposed in the magazine bar had to be pulled out of the magazine bar upwardly, that is to say in the opposite direction to the advance direction, before the magazine bar could be removed and placed on one side. In comparison the line of clips can remain in the magazine bar 100 according to the invention in the pivotal movement. It is even held in its position by the respective drive element in engagement therewith, whereby as a consequence of the pivotal movement, it sags down somewhat on the side opposite to the perpendicular portion 124 of the magazine bar, because of the length compensation effect.

If it should nonetheless be necessary in individual cases for a line of clips which has been drawn up to be removed from a magazine bar, that is made possible in accordance with the invention by virtue of the fact that all drive elements associated with the line of clips in question can be brought out of engagement by a simultaneous inward retraction movement by means of a (further) manually actuable switch which triggers the movement, described with reference to FIG. 3, of the radially movable portion 317 towards the fixed portion 316 of the hub 315. The line of clips is then free and can be withdrawn from the magazine bar again, in the opposite direction to the advance direction.

The invention claimed is:

1. A clip feed arrangement comprising:
   a first magazine bar and a second magazine bar, each magazine bar guiding a line of clips from a clip supply wound on a reel to a separating device of a closure apparatus for producing sausages; and
   a clip drive comprising a two drive mechanism, the two drive mechanism comprising at least one first drive element and at least one second drive element coupled by at least one movable arm, the first drive element from the two drive mechanism being positioned to engage a line of clips within one of the magazine bars, the second drive element from the two drive mechanism being positioned to engage a line of clips within the respective other magazine bar of the two magazine bars.

2. A clip feed arrangement according to claim 1 wherein said two drive mechanism comprises two movable arms each of which includes two drive elements being coupled by the respective movable arms and forming a pair of drive elements.

3. A clip feed arrangement according to claim 1 wherein the drive elements of at least one movable arm circulate in the same direction on a closed path which includes an advance path along a portion of the first magazine bar, on which at least one drive element in a condition of engagement travels in the advance direction of the first magazine bar, and a return path in which the other drive element which is out of engagement travels in opposite relationship to the advance direction of the second magazine bar.

4. A clip feed arrangement according to claim 1 wherein the drive elements of at least one movable arm are positioned to engage the line of clips and the first drive element of one moveable arm in a condition of engagement travels along a first advance path in the advance direction of the first magazine bar while a second disengaged drive element of said movable arm travels along a second advance path in opposite relationship to the advance direction of the second magazine bar and that the engagement and the direction of travel of the drive elements is reversible.

5. A clip feed arrangement according to claim 4 wherein position limit switches are associated with the first and second advance paths and are actuable by the corresponding drive elements respectively triggering the drives of the two drive mechanisms for travel direction reversal of the two drive elements.

6. A clip feed arrangement at least according to claim 4 wherein a manually actuable switch is provided which triggers the reversal in the direction of travel.

7. A clip feed arrangement at least according to claim 4 wherein a manually actuable switch is provided which triggers the reversal of engagement.

8. A clip feed arrangement at least according to claim 4 wherein a manually actuable switch is provided which triggers a drive for the simultaneous disengagement of all drive elements.

9. A clip feed arrangement according to claim 4 characterized in that the first and second advance paths are substantially congruent.

10. A clip feed arrangement according to claim 1 wherein the drive elements have pawls with a freewheel direction in an advance direction and a locking direction in opposite relationship to the advance direction.

11. A clip feed arrangement according to claim 1 wherein the drive elements are movable radially inwardly for the purposes of disengagement and radially outwardly for the purposes of engagement.

12. A clip feed arrangement according to claim 11 wherein position limit switches respectively trigger a drive for the outward movement of the drive element whose direction of travel is reversed into an advance direction and trigger the inward movement of the drive element whose direction of travel is reversed into the direction opposite to the advance direction.

13. In combination:

a closure apparatus for dividing up portion packs of sub-dividable filing material in a flexible tubular case by constriction of the filled tube and the application of two closure elements to the tube plait portion formed by axial displacement of the filling material; and a clip feed arrangement according to claim 1.

* * * * *